United States Patent
Scheerer

(10) Patent No.: US 9,611,882 B2
(45) Date of Patent: Apr. 4, 2017

(54) BACK-OUT RESISTANT FASTENER

(71) Applicant: SFS intec Holding AG, Heerbrugg (CH)

(72) Inventor: Daniel Scheerer, Wyomissing, PA (US)

(73) Assignee: SFS intec Holding AG, Heerbrugg (CH)

( * ) Notice: Subject to any disclaimer, the term of this patent is extended or adjusted under 35 U.S.C. 154(b) by 221 days.

(21) Appl. No.: 14/480,991

(22) Filed: Sep. 9, 2014

(65) Prior Publication Data

US 2015/0071731 A1 Mar. 12, 2015

Related U.S. Application Data

(60) Provisional application No. 61/876,370, filed on Sep. 11, 2013.

(51) Int. Cl.
| | |
|---|---|
| *F16B 35/04* | (2006.01) |
| *F16B 25/00* | (2006.01) |
| *F16B 25/10* | (2006.01) |
| *F16B 43/00* | (2006.01) |

(52) U.S. Cl.
CPC ...... *F16B 25/0021* (2013.01); *F16B 25/0078* (2013.01); *F16B 25/103* (2013.01); *F16B 43/001* (2013.01)

(58) Field of Classification Search
CPC . F16B 25/0021; F16B 25/103; F16B 25/0078
USPC .................................................. 411/411–415
See application file for complete search history.

(56) References Cited

U.S. PATENT DOCUMENTS

| | | | | |
|---|---|---|---|---|
| 2,024,071 A | * | 12/1935 | Taylor ..................... | F16B 4/004 411/399 |
| 2,321,378 A | * | 6/1943 | Green ..................... | F16B 19/06 411/414 |
| 3,541,918 A | * | 11/1970 | Johnson .............. | F16B 25/0031 411/412 |
| 3,861,269 A | * | 1/1975 | Laverty ............... | F16B 25/0031 411/413 |
| 4,861,206 A | * | 8/1989 | Riedel ..................... | F16B 13/02 411/36 |
| 5,320,467 A | * | 6/1994 | Erbes ........................ | F16B 33/02 411/366.3 |
| 5,609,455 A | * | 3/1997 | McKewan ............ | F16B 35/047 411/386 |
| 5,735,653 A | * | 4/1998 | Schiefer .............. | E21D 21/0026 405/259.6 |

(Continued)

FOREIGN PATENT DOCUMENTS

| | | |
|---|---|---|
| DE | 3333055 A1 | 3/1985 |
| DE | 3540413 A1 | 5/1987 |

(Continued)

*Primary Examiner* — Gary Estremsky
(74) *Attorney, Agent, or Firm* — Volpe and Koenig, P.C.

(57) ABSTRACT

A fastener is provided having a cylindrical shaft with a generally constant diameter located between a head and a tapered point. The fastener has a thread integrally extending from the shaft and extending along a portion of a length thereof that terminates at an end of the shaft proximate the head with a back-out discontinuity. At least one ring integrally extends from the shaft in an area of the shaft between the back-out discontinuity and the head. The at least one ring has an outside diameter that is less than an outside diameter of the thread.

10 Claims, 5 Drawing Sheets

(56) References Cited

U.S. PATENT DOCUMENTS

| | | | |
|---|---|---|---|
| 6,264,414 B1 * | 7/2001 | Hartmann | F16B 31/00 411/392 |
| 7,189,045 B2 | 3/2007 | McGovern et al. | |
| 7,367,768 B2 | 5/2008 | McGovern et al. | |
| 8,430,618 B2 | 4/2013 | Baer et al. | |
| 8,616,816 B2 * | 12/2013 | Pieciak, Jr. | F16B 25/00 411/387.2 |
| 2003/0026675 A1 | 2/2003 | McGovern et al. | |
| 2004/0228705 A1 * | 11/2004 | Baer | F16B 35/041 411/424 |
| 2007/0186709 A1 | 8/2007 | Schwendemann | |
| 2007/0224019 A1 | 9/2007 | Hale | |
| 2014/0227061 A1 * | 8/2014 | Platt | E05D 1/00 411/386 |
| 2014/0314522 A1 * | 10/2014 | Lin | F16B 25/0057 411/387.1 |

FOREIGN PATENT DOCUMENTS

| | | |
|---|---|---|
| DE | 4141612 A1 | 6/1993 |
| DE | 29504559 U1 | 2/1996 |
| DE | 29704452 U1 | 7/1998 |
| DE | 19705202 B4 | 4/2005 |
| DE | 20221957 U1 | 10/2009 |
| EP | 1180606 A1 | 2/2002 |
| EP | 1418347 B1 | 4/2008 |
| EP | 1582684 B1 | 7/2008 |
| JP | 2232457 A2 | 9/1990 |
| JP | 2000017736 A2 | 1/2000 |
| JP | 2002295429 A2 | 10/2002 |
| JP | 2005299709 A2 | 10/2005 |

* cited by examiner

US 9,611,882 B2

BACK-OUT RESISTANT FASTENER

INCORPORATION BY REFERENCE

The following documents are incorporated herein by reference as if fully set forth: U.S. Provisional Application No. 61/876,370, filed Sep. 11, 2013.

BACKGROUND

Fasteners, particularly screw type fasteners drive through and/or into two objects, securing them to one another. Subject to certain stresses due to vibrations, thermal expansion/contraction, pulling, or twisting, screw-type fasteners can loosen over time. Moreover, some fasteners, used to retain metal or plastic roofing or siding sheets to a support structure, such as wood framing, may loosen over time, compromising the seal between the fastener head and the sheet material. In some applications, such loosening can lead to serious problems.

Previous methods for preventing screws from backing out, especially in sheet metal screw applications include the use of a washer, in particular a flexible washer, that dampens vibration and secures the fastener to the objects being fastened.

SUMMARY

A fastener includes a cylindrical shaft having a generally constant diameter located between a head and a tapered point. The fastener has a thread integrally extending from the shaft and extending along a portion of a length thereof that terminates at an end of the shaft proximate the head with a back-out discontinuity. At least one ring integrally extends from the shaft in an area of the shaft between the back-out discontinuity and the head. The at least one ring has an outside diameter that is less than an outside diameter of the thread.

In one preferred arrangement, the back-out discontinuity is formed by an abrupt thread termination at an angle approximately perpendicular, preferably 75° to 95°, to the shaft forming a radial face.

In another aspect of the invention, the at least one ring is formed as a radius in cross-sectional profile extending out from the shaft. Preferably, the rings have a cross-section that is defined as half of a circle. However, other geometries are possible, such as a triangular, trapezoidal, or other suitable cross-section.

In another aspect of the invention, an outside diameter of the ring is at least about 5% greater than an outside of the shaft.

Preferably, the ring has a height projecting beyond the shaft that is approximately 25% of a thread height of the thread.

In one preferred arrangement, the back-out discontinuity is formed by a taper in thread height and a change in pitch of the last portion of the thread to a point of self-intersection. At the point of self-intersection, the last portion of the thread preferably terminates approximately perpendicular to the shaft into the adjacent thread wall at a diameter less than the thread outer diameter, and preferably between the shaft diameter and the ring outer diameter. This means that the outside diameter on the back-side (side closer to the head) of the thread termination is significantly less than the diameter at thread run-out, which creates the back-out discontinuity of the thread.

In one arrangement, the fastener has a self-drilling tip.

A threaded connection is also provided including the fastener, a sheet to be connected, and a substrate. The fastener has a cylindrical shaft having a generally constant diameter located between a head and a tapered point. The fastener has a thread integrally extending from the shaft and extending along a portion of a length thereof that terminate at an end of the shaft proximate the head with a back-out discontinuity. At least one ring integrally extends from the shaft in an area of the shaft between the back-out discontinuity and the head. The at least one ring has an outside diameter that is less than an outside diameter of the thread, and greater than a diameter of a hole formed in the sheet connected to the substrate, the at least one ring forming a seal against an inner periphery of the hole by a press fit.

BRIEF DESCRIPTION OF THE DRAWING(S)

DETAILED DESCRIPTION OF THE PREFERRED EMBODIMENTS

Figure 1:
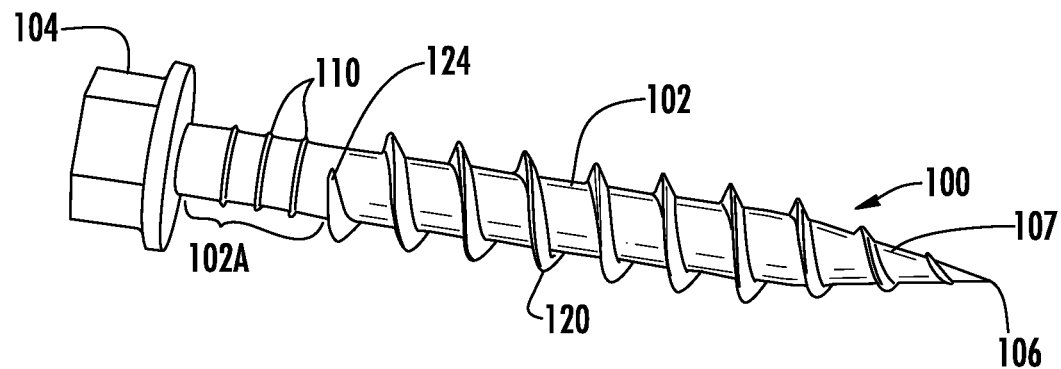
FIG. 1 is a perspective view of a screw according to the invention.
Figure 2:
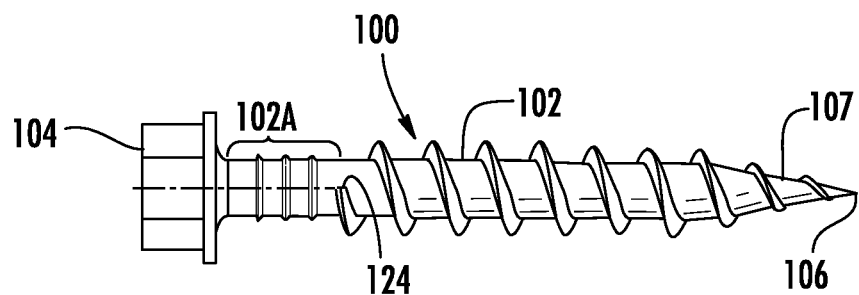
FIG. 2 is an elevation view of a screw.
Figure 3:
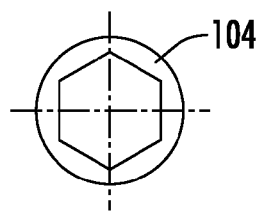
FIG. 3 is a left side view of the screw of FIG. 2.
Figure 4:
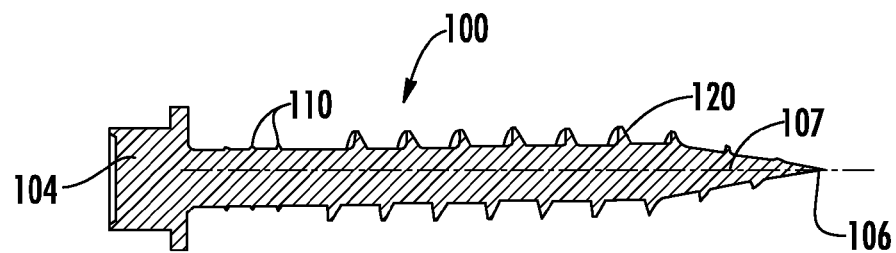
FIG. 4 is a cross-sectional view of the screw of FIG. 2.

FIGS. 1-5 show a first embodiment of a threaded fastener 100, preferably in the form of a screw. The screw 100 comprises a shaft 102, a head 104, a point or tip 106, annular rings 110, and a thread 120. (Although traditionally the plural is used to describe the "threads," a screw thread 120 is typically one helical connected inclined plane, and these terms are used interchangeably herein). Preferably, the rings 110 have a cross-section that is defined as half of a circle. However, other cross-sections could be used.

A screw, such as the screw 100, is one of the six classical simple machines, and combines the simple machines of an inclined plane and wedge. The thread 120 of the screw 100 is made of an inclined plane that encircles the cylindrical shaft 102. The thread 120 or planar inclination allows the screw 100 to fasten more easily and also improves holding power.

The screw tip 106 acts as a wedge that operates by separating objects. When used with the screw 100, the wedge tip 106 creates a hole in the material that the screw 100 engages. The sharper the tip 106, the less force it takes for it to create a hole.

Once the tip 106 creates a small hole, the thread 120 engages the material and drives it apart. The thread 120 may be wound into existing thread grooves within the previously created hole or they may cut their own grooves during insertion. A rotation force applied to the screw 100 drives the screw through the material. This force may be applied with a driving mechanism like a drill or screwdriver. The thread 120 resting within the grooves create a bind that joins materials engaged along the axis of the screw shaft 102. This engagement is the result of converting torque to linear force.

The strength of the screw 100's hold depends on the width of the thread 120 and the distance between them. The closer and wider the threads 120, the stronger the hold will be. More threads, however, require more rotations to attach the screw 100, while wider threads 120 require more force in the rotations.

As shown, the screw thread 120 tapers from their maximum height along the cylindrical shaft 102 along the conical screw portion 107 that leads to the tip 106. At the tip 106, the screw thread 120 height diminishes until it meets and/or forms the tip 106.

Figure 10:
FIG. 10 is view taken along line 10-10 in FIG. 9.
Figure 11:
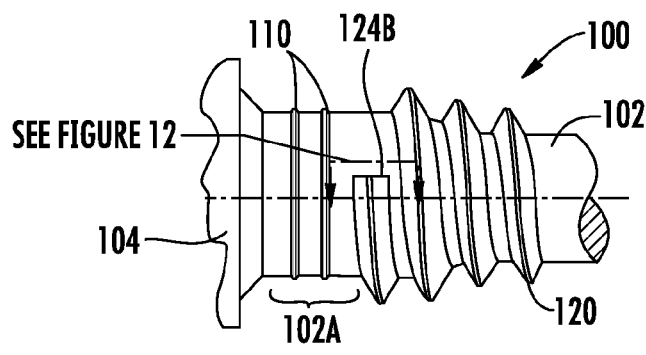
FIG. 11 is an enlarged partial elevational view of a screw showing a discontinuity at the thread termination as a flat termination.
Figure 12:
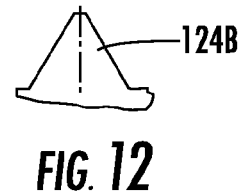
FIG. 12 is view taken along line 12-12 in FIG. 11.
Figure 13:
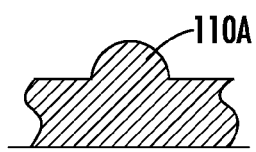
FIG. 13 is a partial cross-sectional view of a first cross-sectional profile for an annular ring on the shaft under the head.
Figure 14:
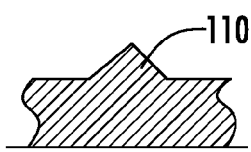
FIG. 14 is a partial cross-sectional view of a second cross-sectional profile for an annular ring on the shaft under the head.
Figure 15:
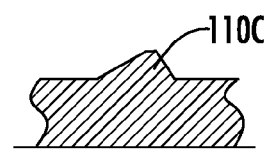
FIG. 15 is a partial cross-sectional view of a third cross-sectional profile for an annular ring on the shaft under the head.
Figure 16:
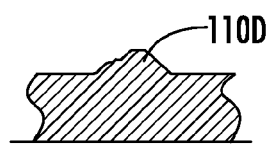
FIG. 16 is a partial cross-sectional view of a fourth cross-sectional profile for an annular ring on the shaft under the head.

Along the length of the screw shaft 102, the screw thread 120 generally maintains a constant height in most uses (although this is not necessary). In the screw 100 shown, the threads stop short of the head 104, leaving a threadless shaft portion 102A where there are no threads 120. The thread termination 124, as shown, terminates in an approximately right angle, preferably in a range of 75° to 95°, to the shaft 102 surface. The termination can have a radial edge 124A as shown in detail in FIGS. 9 and 10, or can have a flat 124B as shown in FIGS. 11 and 12. This approximately perpendicular or sharp termination 124 differs from prior art screws that gradually taper into the shaft 102. The approximately perpendicular thread termination 124 creates a discontinuity by forming an approximately perpendicular radial edge 124A or flat 124B that discourages unwanted thread back-out, particularly when the screw 100 engages a substructure to fasten sheet metal or similar thin materials in place, as the approximately perpendicular termination will not act as easily as a wedge upon backing out. A tapered thread termination, by contrast, creates a more ideal wedge that eases backing out.

Figure 9:
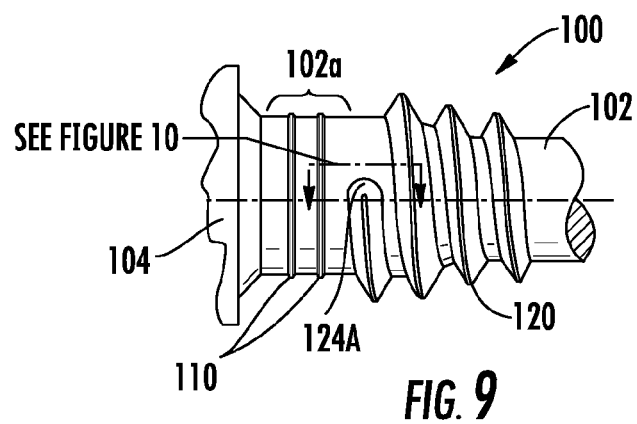
FIG. 9 is an enlarged partial elevational view of a screw showing a discontinuity at the thread termination with a radial edge.

FIGS. 9 and 11 also show an increase from the root diameter of the thread to the shaft or shank diameter beneath the head 104. This may or may not be present depending on the particular construction.

The thread termination 124 also maximizes a usable thread area and its termination aides in washer assembly using the screw 100. The ability to better use this thread in a washer assembly is a benefit, again, in sheet metal applications where washer used with a screw is common. For example, as shown in the threaded connection 125 of FIG. 5 for a sheet metal application, the screw 100 has a washer 126 with a rubber gasket 128 located under the head 104 and has an open hole with a diameter close to that of the shaft 102's diameter. During assembly, the most efficient way to mount such a washer is to press it onto the screw, but the threads can damage the rubber gasket during the pressing step. The screw 100, on the other hand, with its threadless portion 102A has less thread 120 surface area with which to damage a washer. Further, once a washer is within the threadless portion 102A, the rings 110 can engage the washer to hold it in place during coating and packaging steps. During installation, the screw 100 is driven through a metal sheet 130 and into a substrate 132. The screw 100 forms a hole 132 in the sheet 130 that is approximately the diameter of the shaft 102.

Figure 5:
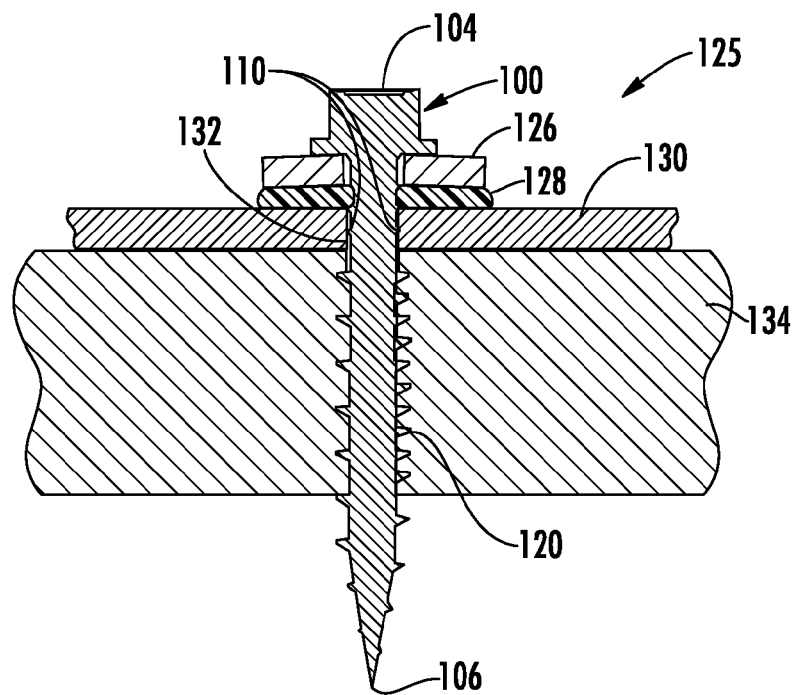
FIG. 5 is a cross-section view of a threaded connection using the fastener of FIG. 1.

Within the threadless shaft portion 102A there is another discontinuity in the shaft 102: the annular rings 110. As shown in FIG. 5, the rings 110 take advantage of the fact that a screw 100 creates a hole in a material that has a diameter approximately equal to the root diameter of the threads. The rings 110 have an outer diameter that is larger than the diameter of the shaft 102 and thus create a press-fit into the material engaged by the screw, further reducing the screw 100's chances of backing out. This press-fit also creates a further seal directly between the screw 100 and the hole 132 in the metal sheet.

The annular rings 100 are shown as numbering three in FIG. 5, but in order to be effective, at least only one is required. For example, FIGS. 9 and 11 only show two of the rings 100. Dimensionally, they are shown as having an outer diameter greater than the shaft 102, but smaller than the head 104 and thread 124. The ratio of the diameter of the rings to the diameter of the shaft has been found to be optimally between 1.05:1 and 1.22:1. FIGS. 13-16 show some of the preferred cross-sectional configurations that can be used for the annular ring 100, such as 100A in FIG. 13, which is semi-circular, 100B in FIG. 14, which is triangular, 100C in FIG. 15, which is a quadrilateral, and a complex profile 100D in FIG. 16, which provides a rounded profile with two steps. Of course, those skilled in the art will recognize that various other cross-sectional profiles can be used for the annular rings 100.

Figure 6:
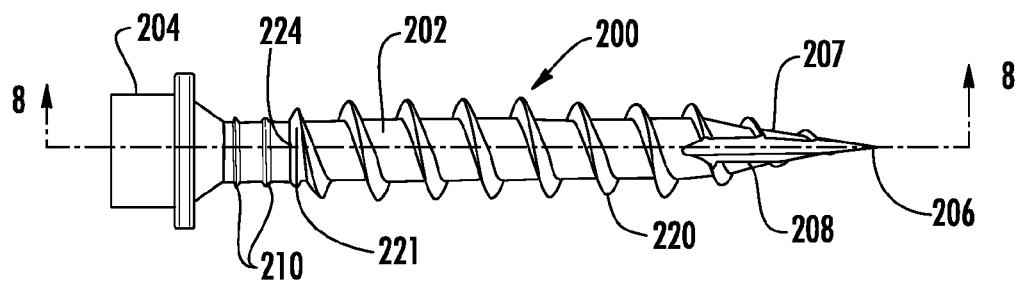
FIG. 6 is an elevational view of a second embodiment of a screw according to the invention.
Figure 7:
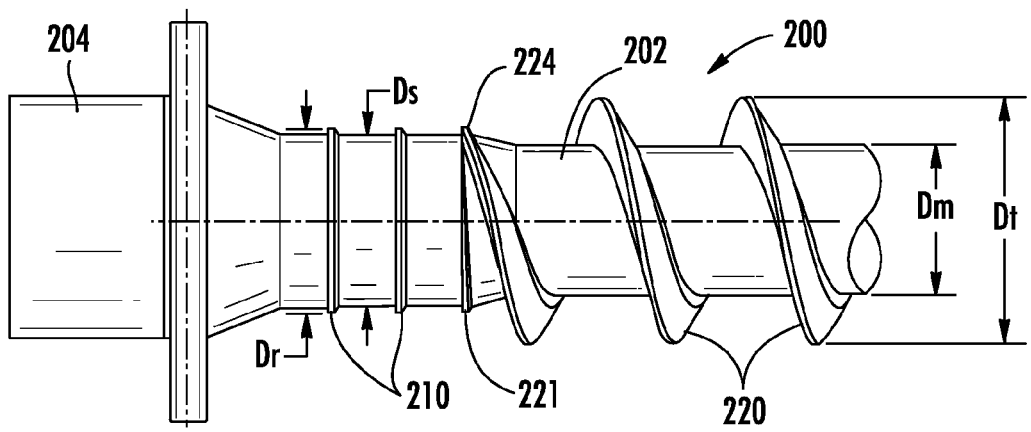
FIG. 7 is an enlarged detail of a portion of the screw in FIG. 6.
Figure 8:
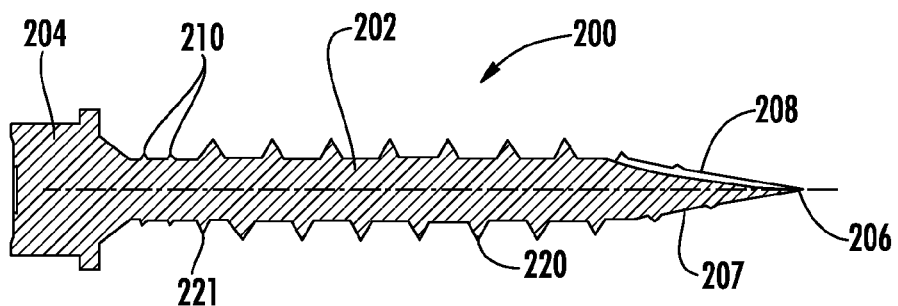
FIG. 8 is a cross-sectional view through the screw of FIG. 6.

Referring now to FIGS. 6-8, a second embodiment of a fastener 200, preferably in the form of screw, is shown. The screw 200 includes a shaft 202, head 204, and threads 220 that terminate at a distance from the underside of the head 204. At least one annular ring 220 is located on the shaft 202 between the head 204 and the termination of the thread 220, on a threadless portion of the shaft 202. The shaft 202 tapers along a conical screw portion 207 that leads to a screw tip 206. This generally corresponds with the first embodiment of the screw 100. In this embodiment, the screw 200 is self-drilling and includes a cut 208 along the conical screw portion 207 to create a sharp cutting edge on the threads 220 and the shaft 202. This not only drills the hole in the materials to be connected, but also is preferably self-tapping, allowing the threads to be cut on the inside of the hole that is formed.

Additionally, as shown in detail in FIG. 7, the back-out discontinuity 224 is formed by a taper in thread height and a change in pitch of the last portion of the thread 221 to a point of self-intersection at the termination of the thread 220 in an area spaced apart from the head 204. At the point of self-intersection, the last portion of the thread 221 preferably terminates approximately perpendicular to the shaft 202 into the adjacent thread wall of the thread 220 at a diameter that is less than the thread outer diameter $D_T$, and preferably between the shaft diameter Ds and the ring outer diameter $D_R$. This means that the outside diameter of the last thread portion 221 on the back-side (side closer to the head) of the thread termination is significantly less than the diameter at thread run-out, which creates the back-out discontinuity 224 of the thread. Here, the ratio of $D_R$:$D_S$ is also 1.05:1 and 1.22:1. The ring 220 has a height projecting beyond the shaft that is approximately 25% of a thread height of the thread 220. In FIG. 7, $D_M$ is noted as the thread root diameter, which can be the same as or smaller than the shaft diameter Ds. In one preferred arrangement, $D_R$=0.160-0.170 inches, Ds=0.150 inches, and $D_T$=0.209-0.215.

Figure 17A:
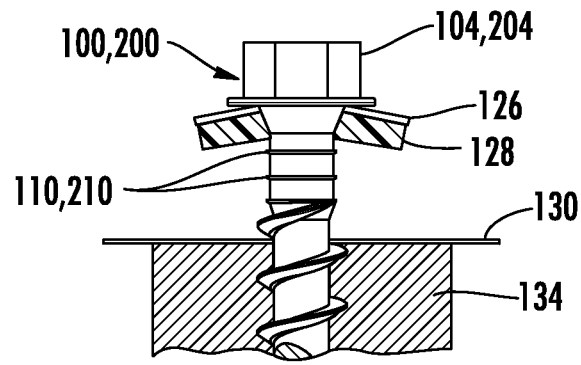
FIG. 17A-FIG. 17C are partial elevational views showing the installation of a screw according to the first and second embodiments to hold a metal sheet to a substructure, and the sealing effect that is provided, even if the screw begins to loosen.
Figure 17B:
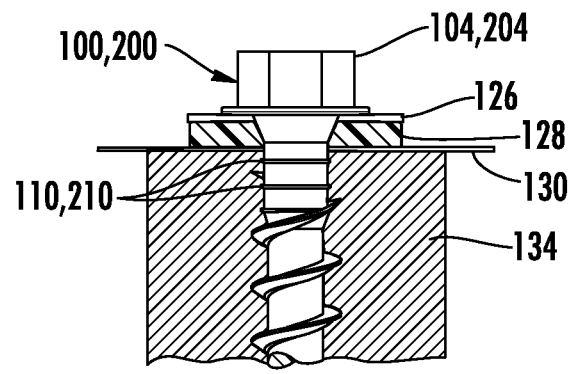
Figure 17C:
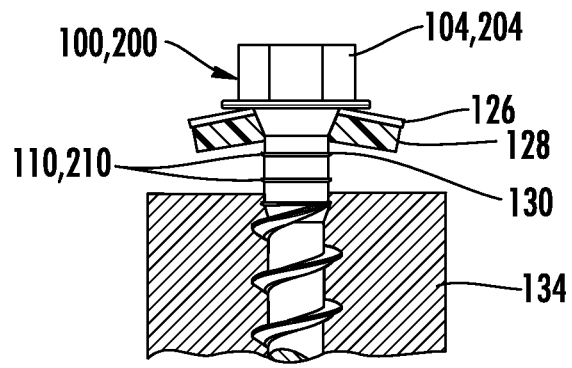

Referring now to FIGS. 17A-17C, an assembly sequence of the screw 100, 200 with a washer 126 and gasket 128 to hold a material sheet, such as a metal sheet 130, to a substructure 134 is shown, along with the additional sealing feature provided by the ring 110, 210 in the event that the screw 100, 200 becomes partially loosened. As shown, during installation in FIGS. 17A and 17B, the head 104, 204 of the screw 100, 200 is tightened, forcing the annular rings 110, 210 to pass through the undersized hole formed in the sheet 130, and the tightening continues until the washer 126 partially compresses the gasket 128 against the metal sheet 130. As shown in FIG. 17B, the annular rings 110, 210 pass through the hole in the metal sheet, which expands at least in part elastically as the annular rings 110, 210 pass through. The result is that the hole in the metal sheet 130 remains at most the same size, and preferably, smaller than the ring diameter $D_R$. Although the discontinuity formed by the thread termination 124 helps to resist back-out, it can still occur under certain conditions. If the screw 100, 200 begins to loosen, as shown in FIG. 17C, the annular rings 110, 210 engage the underside of the metal sheet 130, so that even if the screw 100, 200 begins to back-out, the metal sheet 130 is raised from the substructure 134 by the metal rings 110, 210, and the connection can remain water tight through many degrees of rotation of the screw 100, 200. This prevents leaks and allows time for the problem to be fixed to the extent that bowing of the metal sheet 130 is noticed before leaks occur within the assembly.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A fastener comprising:
a cylindrical shaft located between a head and a tapered point;
a thread integrally extending from the shaft and extending along a portion of a length thereof that terminates at an end of the shaft proximate the head with a back-out discontinuity, the shaft having a shaft diameter defining a shaft surface between the back-out discontinuity and the head; and
at least one ring having an outside diameter that is less than an outside diameter of the thread integrally extending from the shaft in an area of the shaft having no threads between the back-out discontinuity and the head, the at least one ring being spaced apart from the head only by a portion of the shaft surface, and the back-out discontinuity comprising an abrupt thread termination at an angle approximately perpendicular to the shaft and extending parallel to an axis of the shaft.

2. The fastener of claim 1, wherein the back-out discontinuity is the abrupt thread termination, and the abrupt thread termination forms a radial edge or face.

3. The fastener of claim 1, wherein the at least one ring is formed as a radius in cross-sectional profile extending out from the shaft.

4. The fastener of claim 1, wherein an outside diameter of the ring is at least about 10% greater than an outside of the shaft.

5. The fastener of claim 1, wherein the ring has a height projecting beyond the shaft that is approximately 25% of a thread height of the thread.

6. A threaded connection including the fastener of claim 1, further comprising a sheet and a substrate, the outside diameter of the at least one ring is greater than a diameter of a hole formed in the sheet connected to the substrate, with the at least one ring forming a seal against an inner periphery of the hole by a press fit.

7. A fastener comprising:
a cylindrical shaft located between a head and a tapered point;
a thread integrally extending from the shaft and extending along a portion of a length thereof that terminates at an end of the shaft proximate the head with a back-out discontinuity; and
at least one ring having an outside diameter that is less than an outside diameter of the thread integrally extending from the shaft in an area of the shaft having no threads between the back-out discontinuity and the head, and the back-out discontinuity is formed by a taper and change in pitch of a last portion of the thread to a point of self-intersection with an adjacent portion of the thread.

8. The fastener of claim 7, wherein at the point of self-intersection, the last portion of the thread is approximately perpendicular to an axis of the shaft and terminates into the adjacent thread wall at a diameter less than a thread outer diameter.

9. The fastener of claim 7, wherein the fastener has a self-drilling tip.

10. A threaded connection including the fastener of claim 7, further comprising a sheet and a substrate, the outside diameter of the at least one ring is greater than a diameter of a hole formed in the sheet connected to the substrate, with the at least one ring forming a seal against an inner periphery of the hole by a press fit.

* * * * *